United States Patent
Pinson (12)

(10) Patent No.: US 8,625,974 B1
(45) Date of Patent: Jan. 7, 2014

(54) OBSCURING ADVERTISEMENTS DURING TRICK MODE OPERATION

(75) Inventor: George Scott Pinson, Portland, OR (US)

(73) Assignee: ARRIS Enterprises, Inc., Suwanee, GA (US)

( * ) Notice: Subject to any disclaimer, the term of this patent is extended or adjusted under 35 U.S.C. 154(b) by 234 days.

(21) Appl. No.: 13/113,431

(22) Filed: May 23, 2011

Related U.S. Application Data

(60) Provisional application No. 61/347,387, filed on May 22, 2010.

(51) Int. Cl.
*H04N 5/783* (2006.01)

(52) U.S. Cl.
USPC .......................................... 386/350; 725/36

(58) Field of Classification Search
USPC ................. 386/343, 350; 725/32, 36
See application file for complete search history.

(56) References Cited

U.S. PATENT DOCUMENTS

| | | | | |
|---|---|---|---|---|
| 7,043,746 B2* | 5/2006 | Ma | | 725/22 |
| 7,716,700 B2* | 5/2010 | Carlucci et al. | | 725/32 |
| 7,877,766 B1* | 1/2011 | Wu et al. | | 725/22 |
| 7,962,942 B1* | 6/2011 | Craner | | 725/88 |
| 8,055,781 B2* | 11/2011 | Fernandez | | 709/229 |
| 8,355,506 B2* | 1/2013 | Smith | | 380/210 |
| 2003/0149975 A1* | 8/2003 | Eldering et al. | | 725/34 |
| 2003/0188317 A1* | 10/2003 | Liew et al. | | 725/88 |
| 2004/0073947 A1* | 4/2004 | Gupta | | 725/134 |
| 2009/0172723 A1* | 7/2009 | Shkedi et al. | | 725/32 |
| 2010/0218208 A1* | 8/2010 | Holden | | 725/32 |

* cited by examiner

*Primary Examiner* — David Harvey
(74) *Attorney, Agent, or Firm* — Troy A. Van Aacken

(57) ABSTRACT

Various methods, systems, and apparatuses can be used to obscure advertisements during trick mode operations. In some implementations, the trick mode stream can be selected so as to not include advertisement frames within the trick mode stream. Upon resuming normal operation, the advertisements can be included within the normal playback stream.

19 Claims, 8 Drawing Sheets

OBSCURING ADVERTISEMENTS DURING TRICK MODE OPERATION

RELATED APPLICATIONS

This application is a non-provisional application claiming the benefit of co-pending U.S. Provisional Application Ser. No. 61/347,387, entitled "Obscuring Advertisements During Trick Mode Operation," filed May 22, 2010, which is hereby incorporated by reference in its entirety.

TECHNICAL FIELD

This disclosure relates to feedback information provided to users during trick mode operations.

BACKGROUND

In addition to transporting data traffic, as well as television content signals over a CATV network, multiple services operators (MSO) also use their CATV network infrastructure for carrying voice, video on demand (VoD) and video conferencing traffic signals, among other types. Digital video recorders (DVRs) and personal video recorders (PVRs) have allowed users to record programs for later viewing, thereby time-shifting their television viewing. Moreover, video services over internet protocol (IP) have become increasingly available from a multitude of content providers and/or distributors, including, for example, YouTube, Hulu, Netflix, ESPN, etc.

Traditional distribution models typically derive revenue from advertising. However, traditional distribution models do not take into account various trick mode features such as forward search (e.g., fast forward) and reverse search (e.g., rewind). These features can allow users to skip over advertisements thereby reducing the value of the advertising spot for the provider's advertisers. Some content providers have attempted to combat this problem by disabling trick mode functions altogether or only during advertisements. Other content providers have attempted to avoid the problem by returning to normal mode during an advertisement. However, viewers can become confused when these methods are employed.

BRIEF DESCRIPTION OF THE DRAWINGS

Like reference numbers and designations in the various drawings indicate like elements.

DETAILED DESCRIPTION

Figure 1:
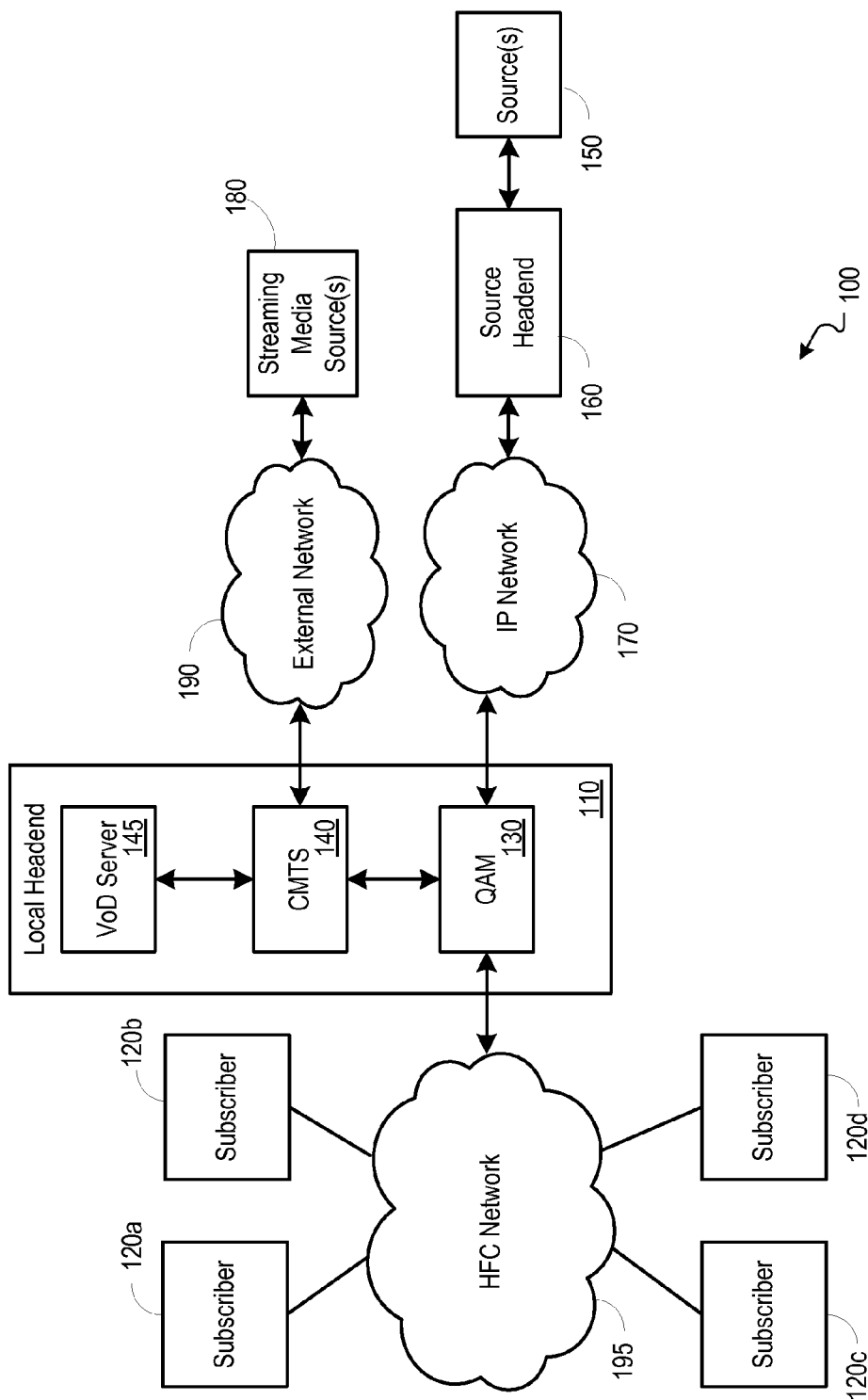
FIG. 1 is a block diagram illustrating an exemplary network environment operable to provide obscured advertisements during trick mode operation.

In many systems, trick mode (such as, e.g., forward search, reverse search, skip ahead, skip back, etc.) is enabled during playback of available content. Available content can include video on demand content retrieved from a remote server or content retrieved from a local store (e.g., from a DVR, PVR, or other end-user content access device). However, because advertisers pay for these slots, they would like users to view the advertisements. Sometimes, advertisers require that MSOs disable trick mode functionality during playback of advertisements. However, this can be intrusive to viewers, and can be especially disruptive for viewers who are merely trying to locate a scene rather than intending to bypass advertisements.

Thus, in some implementations of this disclosure, systems and methods can operate to obscure advertisements during trick mode operations. For example, when a user enters trick mode, the content can appear continuous, as if there were no advertisements within the content. In some implementations, when a user returns to normal playback, and is determined to have skipped an advertisement break, the skipped advertisement break can be queued up to be presented prior to resumption of the content playback. In other implementations, when a user returns to normal playback, the content is restarted immediately, ignoring any skipped advertisement breaks. However, because the advertisements are not shown in trick mode, the user does not know when the advertisement break has been passed or not. While many of the implementations disclosed herein are described in terms of forward search and reverse search, it should be understood that similar techniques can be applied to skip forward and skip backward functionality to reduce the efficacy of those functions in skipping advertisements, as well.

In further implementations, a device can infer the intent of the user based upon context associated with user inputs. Such inferred intent can be used to determine whether to queue the advertisements for presentation on exit from trick mode. Thus, for example, if a user enters trick mode during an advertising break, it can be inferred that the user is attempting to skip advertisements, and the advertisements can be queued for presentation upon exit of trick mode. Alternatively, if the user skips over a substantial portion of content in trick mode, it can be inferred that the user is searching for a scene rather than attempting to skip advertisements, and any skipped advertisements are not shown upon return to normal playback. In still further alternative examples, if the user returns to normal playback within a specified period of time after an advertisement break, it can be inferred that the user intended to skip the advertisement break, and the advertisements for the break can be queued for presentation to the user upon return to normal playback. In some implementations, if the user skips multiple advertising breaks, the playback device might avoid displaying advertisements, or might only provide a portion of the skipped advertisements, rather than queuing all of the skipped advertisements.

FIG. 1 is a block diagram illustrating an exemplary network environment 100 operable to obscure advertisements during trick play operation. In some implementations, a headend 110 can provide video, data and/or voice service(s) to one or more subscribers 120a-d (e.g., cable modem(s) and/or set-top box(es)). The headend 110 can include devices such as an edge quadrature amplitude modulation (EQAM) device 130 and a cable modem termination system (CMTS) 140.

Video streams can be received from a video source (or sources) 150 through a source headend 160 via a network(s) 170 (e.g., including an IP network). In some implementations, these video streams can enter the system as raw moving picture experts group (MPEG) streams, or any other streaming video protocol supported by the headend 110 and/or EQAM device 130.

In other implementations, video streams can be received by the CMTS 140 from a video on demand (VOD) server 145. The VOD server can receive requests for video service via the CMTS, and provide the requested video to the CMTS. The CMTS can address the video to one or more subscribers 120a-d and forward the addressed video to the QAM for modulation onto a carrier signal.

Data services can be handled by the headend 110 through a CMTS 140. The CMTS 140 can receive data signals from subscribers 120a-d and server(s) 180 through an external network(s) 190 (e.g., including the Internet). The network(s) 190, for example, can operate using Internet protocol (IP), sending data packets to and receiving data packets from the headend 110. In some examples, the CMTS 140 can be paired with a SIP proxy server (not shown) operable to provide voice over internet protocol (VoIP) services with connectivity to the public switched telephone network (PSTN). In still further examples, one or more video sources 150 may provide streaming data through the network(s) 190 to the CMTS 140.

In some implementations, the CMTS 140 can forward received packets to the EQAM device 130 used to modulate the signal onto a carrier waveform. The carrier waveform can include both data and video streams, in both multicast and unicast (e.g., point-to-point) formats for transmission to a combiner, which can combine multiple signals onto a single fiber for transmission to one or more service groups 120a-d via a hybrid fiber-coax (HFC) network 195. In other implementations, the CMTS 140 can modulate a baseband signal to a carrier wave and transmit the signal to a combiner for upconversion to a transmission frequency.

In some implementations, edge termination devices (e.g., including CMTS, EQAM systems, wireless access points, and wireless base stations, among others) can include a combiner operable to multiplex multiple baseband signals into multiple RF channels for output to one or more ports. The edge termination devices can further include a switching module operable to provide switching to configure which RF channels are connected to each output port. In some implementations, the switching module can configure a number of RF channels connected to each output port. Thus, for example, where a particular service group consumes a large amount of bandwidth, the switching module can connect more RF channels to that service group. In another example, where a particular service group does not consume a large amount of bandwidth, the switching module might provide no more than the number of channels indicated by the bandwidth consumption.

When a device, such as, e.g., CPE device 120a-d initially attempts connect to the headend 110, the device 120a-d can go through a registration process with the headend 110. The registration process typically includes retrieval of a configuration filename from a dynamic host control protocol (DHCP) server through an internal or external network. Upon receipt of the configuration filename, the CPE device 120a-d identifies a trivial file transfer protocol (TFTP) server where the configuration file is stored. The CPE device 120a-d then requests the configuration file from the TFTP server using the filename provided by the DHCP server. Upon receiving the configuration file, the CPE device 120a-d registers with the CMTS 140.

In some implementations, one or more of the VOD server 145, the subscriber device(s) 120a-d, the streaming source(s) 150, 180, or any of the device(s) that reside at the headend can be operable to obscure advertisements during trick mode operation.

Figure 2:
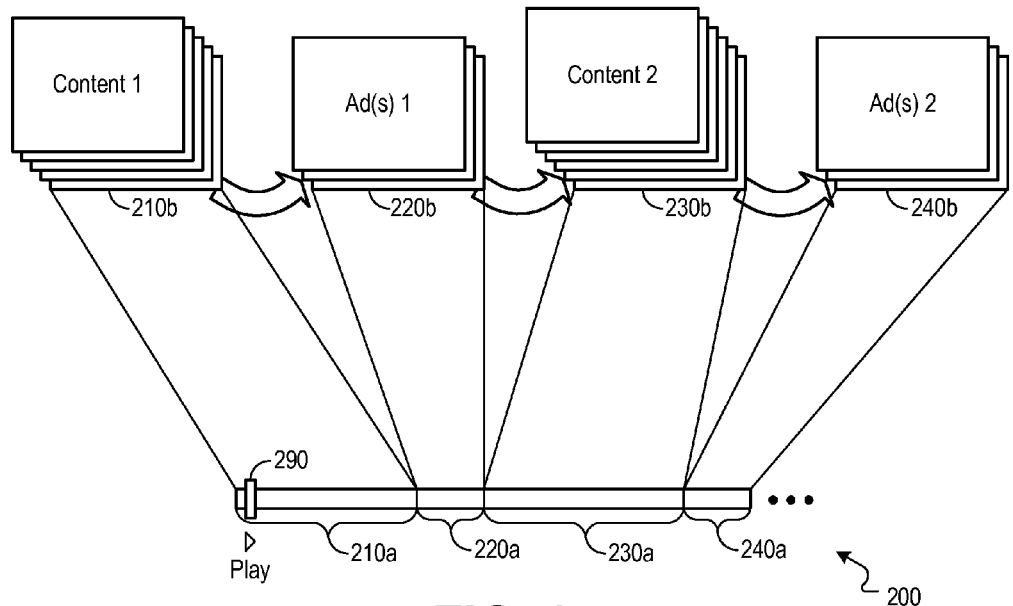
FIG. 2 is a block diagram illustrating an example flow for a program in normal playback mode with advertisements inserted at various intervals.

FIG. 2 is a block diagram illustrating an example flow for a program in normal playback mode with advertisements inserted at various intervals. The status bar 200 can indicate a user's progress through a program. A first segment 210a of the status bar 200 can correspond to a first portion of the content 210b. A second segment 220a of the status 200 bar can correspond to a first advertising break comprising advertisements 220b. Next a third segment 230a of the status bar 200 can correspond to a second portion of the content 230b, and a fourth segment 240a of the status bar 200 can correspond to a second advertising break comprising advertisements 240b.

Thus, in normal playback, during the first segment 210a of the status bar, a first portion of the content 210b will be displayed and during the third segment 230a of the status bar 200, a second segment of the content 230b will be displayed. The first portion of the content 210b can comprise various digital video formats (e.g., including any motion picture experts group (MPEG) video standard, video compression 1 (VC1) standards, audio video interleave, etc.), as well as analog video. In some implementations, the content 210b can include a frame-based construction, whereby frames (e.g., including intra-coded frames (i-frames), predictive coded frames (p-frames), and/or bidirectional coded frames (b-frames) of the video are communicated to the display device.

Upon completion of the first portion of content 210b or a second portion of content 230b, the display device can display a first set of advertisements 220b or a second set of advertisements 240b, respectively. The advertisements 220b, 240b can include content in various digital or analog video formats. In some implementations, the advertisements 220b, 240b can be woven into the content 210b, 230b at a headend device. In such implementations, the advertisements 220b, 240b can be delineated from the content using tags within the content. In other implementations, the advertisements can be inserted into the content at the set top. In such implementations, the content can include tags notifying the set top box when to retrieve advertisements and where to insert the advertisements into the content. In still further implementations, the presence of an advertisement can be inferred in non-tagged content based upon elapsed time within a program, abrupt picture or volume changes within the stream, or the presence or absence of a watermark within the streaming content.

Figure 3:
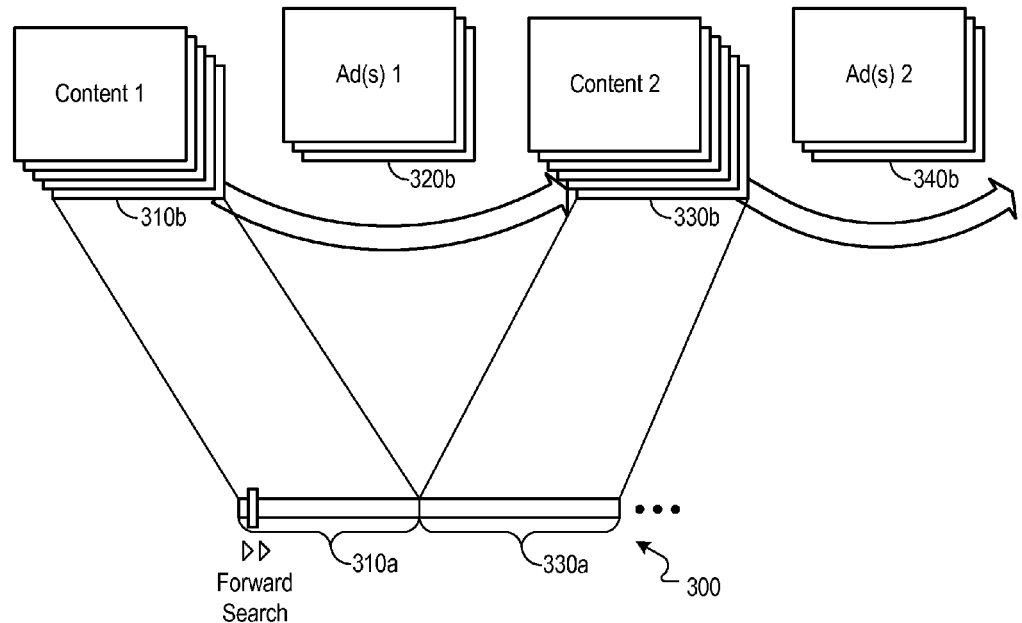
FIG. 3 is a block diagram illustrating an example flow for a program in trick mode having advertisements obscured.

FIG. 3 is a block diagram illustrating an example flow for a program in trick mode having advertisements obscured. When the user enters trick mode, the status bar 300 shows that the advertisements have been removed from the flow of the program stream. It should be understood that the status bar displayed to the user need not physically shrink, but rather the status bar 300 in the figures is shown smaller for purposes of clarity in explanation. However, in some implementations, the status bar 300 displayed to the user can be reduced to provide better context of where the currently displayed frame resides within the content.

In some implementations, when the user enters trick mode, the advertisements 320b, 340b can be obscured for the duration of the trick mode operation. Thus, the user would only see trick mode frames selected from the content frames 310b, 330b for the duration of time the user remains in trick mode. For example, while the status bar is in a first segment 310a, trick mode frames for the trick mode operations can be selected from the first portion of content 310b, and while the status bar is in the second segment 330a, trick mode frames for the trick mode operations can be selected from the second portion of content 330b.

In some implementations, the point of separation between the first content frames 310b and the second content frames 330b can be obscured so as to prevent the user from knowing exactly where in the content the advertisement breaks reside. Thus, the user cannot use the context provided by the display to determine whether an advertising break is over. Without this context, the user is just guessing as to where to resume normal playback. For example, a user might fast forward past an advertising break, but miss a portion of the content that follows the advertising break. Upon realizing that he/she has missed a portion of the content that follows the advertising break, he/she might decide to rewind. Because the contextual frames and/or status bar location of the advertisements are missing, he/she might reverse too far and end up prior to the advertising break. Thus, obscuring the advertisements can reduce the utility of the forward and reverse search functions in skipping advertisements.

In some implementations, a control device (not shown) for the video presentation system can keep track of whether or not a user has overrun a scheduled advertising. In such implementations, when a user returns to normal playback, the device can determine whether to replay a skipped advertisement. In further implementations, a control device can keep track of how many advertisements have been skipped and can replay only a subset of those advertisements upon return to normal playback mode.

In additional implementations, a determination can be inferred from the user's actions about whether the user entered trick mode with the purpose of skipping advertisements. For example, if the advertisement is a small portion of the time the user remains in trick mode, it might be assumed that the user is searching for a scene rather than skipping advertisements. In another example, if the user enters trick mode within a certain period of time (e.g., 5-10 seconds) before the advertisement and/or exits trick mode within a certain period (e.g., 5-10 seconds) of time after the advertisement would have concluded, it can be assumed that the user is attempting to skip advertisements. In those implementations where the skipped advertisement(s) can be queued for after the user returns from trick mode operation, the skipped advertisement(s) can be displayed to the user prior to resuming play on the content.

Figure 4A:
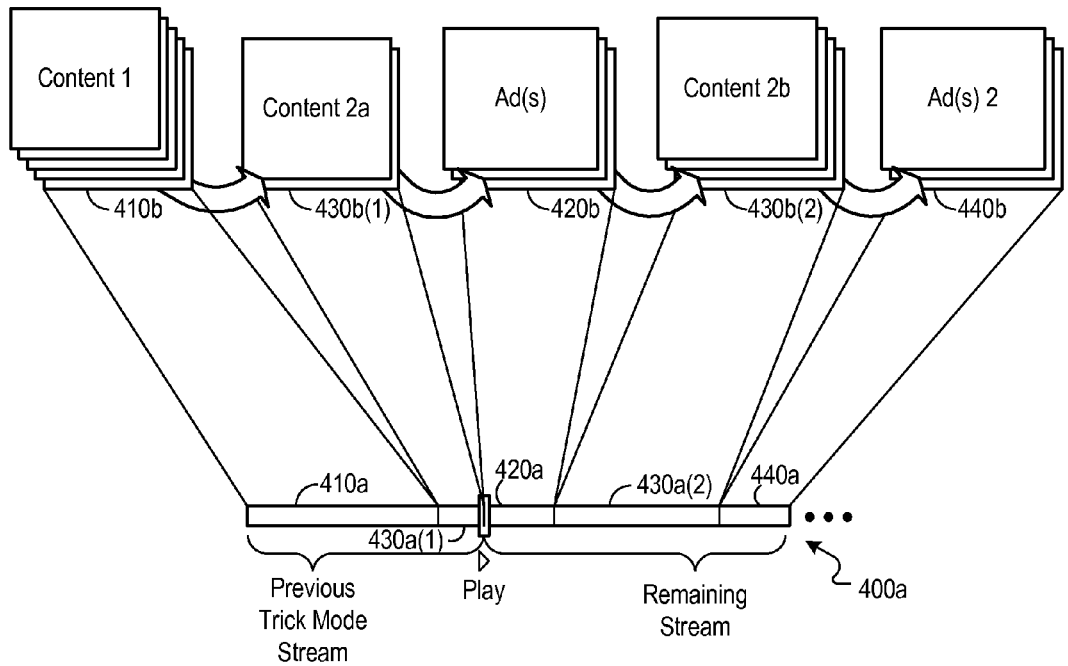
FIGS. 4A-B are block diagrams illustrating example flows for a program when the trick mode has overrun a scheduled advertisement slot.
Figure 4B:
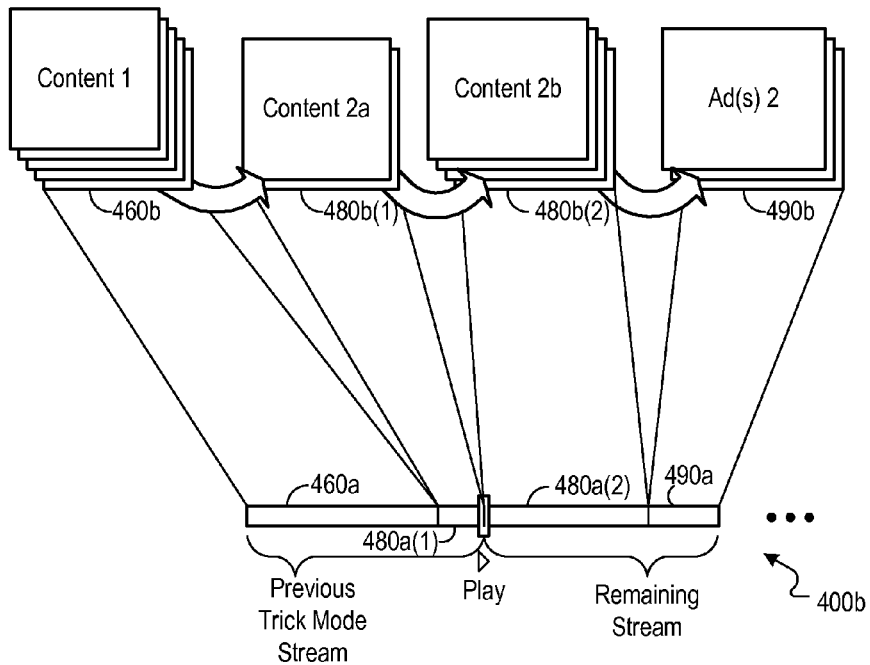

FIGS. 4A-B are block diagrams illustrating example flows for a program when the trick mode has overrun a scheduled advertisement slot. FIG. 4A illustrates a situation where an advertisement 420b is reinserted into the video stream after the user has skipped over an advertisement in trick mode (e.g., intentionally or unintentionally). Thus, for example, at some point prior to the display of the advertisement 420b, the user entered a forward search mode and continued in trick mode past the end of the first portion of content 410b represented on the status bar as segment 410a. Because the user continued in trick mode past the end of the first portion of content 410b, the user continued into a portion 430a(1) of the second portion of content 430b(1), 430b(2).

In some implementations, upon receiving a request from the user to exit trick mode and resume normal playback, the video presentation system can determine to insert advertisement(s) 420b into an ad break segment 420a of the status bar 400 prior to resumption of the second portion of the second content 430b(2). In some implementations, the advertisements 420b inserted into the ad break segment 420a are the same as the advertisements that were skipped. In other implementations, the advertisements 420b inserted into the ad break segment 420a are different than the advertisements that were skipped. For example, the advertisements might be refreshed by the video presentation system. Upon completion of the advertisement content 420b, the second portion of the content 430b(2) can be displayed, followed by display of the second advertisement(s) 440b, assuming the system continues in normal playback mode through until the second advertisement(s) 440b are accessed.

In such implementations as those described in FIG. 4A, the user is provided no benefit from skipping over advertisements, because the advertisement is queued up for playback upon resumption of normal playback mode. Thus, the video presentation system can facilitate forward and reverse search modes for searching content, but reduces the efficacy of using forward and reverse search modes for skipping advertisements.

FIG. 4B illustrates one or more alternative implementations where advertisements which are skipped during trick mode are not reinserted into the video stream after the user has skipped over an advertisement in trick mode (e.g., intentionally or unintentionally). In some implementations, when the user is in a first segment 460a of the status bar 400b and selects a trick mode function, the video presentation system (e.g., VOD server or DVR), can begin selecting trick mode frames from the content at an increased presentation rate (e.g., in a normal playback mode, the video presentation system might present each of frames 0-100, while in a forward search trick mode, the system might present only frames 0, 20, 40, 60, 80 and 100, for example, thereby appearing to increase the presentation rate of the stream).

In some implementations, the frames selected for presentation during trick mode functionality do not include any advertisement frames. Upon resumption of normal playback, the video presentation system can resume normal playback at whatever point within the content that the user requested to resume normal playback. Thus, instead of queuing the advertisement for later playback, the context for the user to recognize when the advertisement would have been displayed is obscured such that the user does not know where within the content the advertisement resides. Thus, if the user is intending to skip commercials, the user will likely also end up skipping over content. For example, a user might be in normal playback mode when a commercial starts and requests forward search trick mode. As soon as the video presentation system enters trick mode, the advertisement is removed from the stream, and the user is fast forwarding past content. Then, when the user emerges from trick mode, the user has bypassed some of the content as well as the advertisement. Moreover, if the user decides to reverse back to the beginning of the second content 480b(1), the user is likely to end up back in the first content 460b. Thus, it can be appreciated that the utility of the trick mode for skipping over advertisements is reduced.

Figure 5:
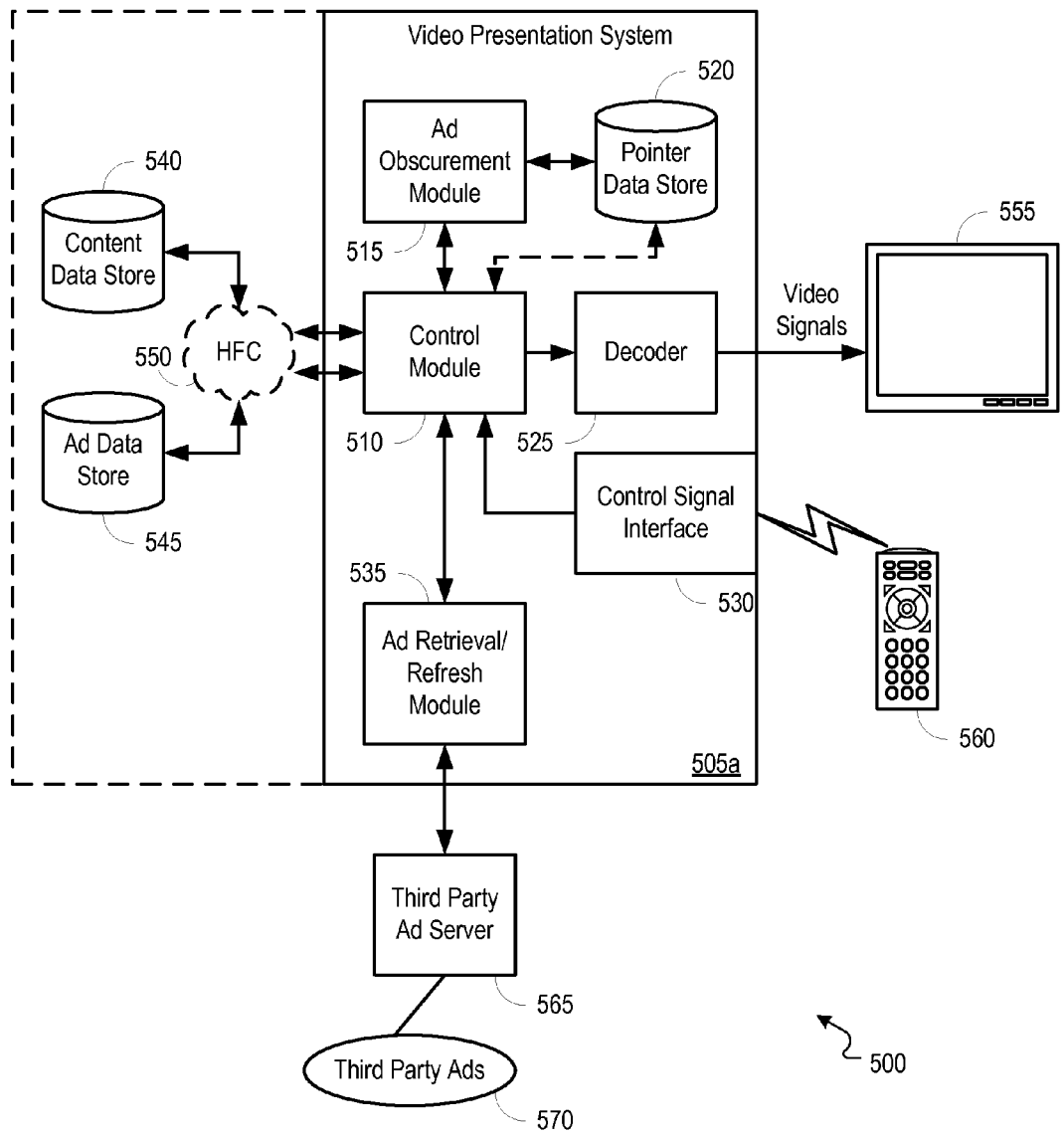
FIG. 5 is a block diagram illustrating an example digital video recorder/video on demand system providing obscured advertisements during trick mode operation.

FIG. 5 is a block diagram illustrating an example digital video recorder/video on demand system providing obscured advertisements during trick mode operation. In some implementations, a video presentation system 500 can include a control module 510 (e.g., a processor), an ad obscurement module 515, a pointer data store 520, a decoder 525, a control signal interface 530, and an ad retrieval/refresh interface 535. In some implementations, the video presentation system 500 can also include a content data store 540 and/or an advertisement data store 545. In alternative implementations, a content data store 540 and/or an advertisement data store 545 can reside at a headend and can be communicated to the video presentation system through an HFC network 550.

In some implementations, the control module can retrieve content and/or advertisement data from the content data store 540 and the advertisement data store 545, respectively. In those implementations where the content data store 540 is part of the video presentation system 500, the content can be communicated to the control module via a bus interface. In those implementations where the ad data store 545 is part of the video presentation system 500, the advertisements can be communicated to the control module via a bus interface. Alternatively, the content and/or advertisements can be communicated to the control module through an HFC network 550.

In some implementations, the control module can specify which frames to retrieve from the data stores 540, 545. For example, while in trick mode, the control module may only request a subset of frames based upon the requested trick mode functionality. Upon receiving the content and/or advertisement data, the control module 510 can forward the content and/or advertisement data to a decoder 525.

In some implementations, the decoder 525 can operate to decode the content and/or advertisement frame data. The content and/or advertisement frame data can be encoded in a variety of different formats, compressed or uncompressed. The decoded content and/or advertisement frame data information can be communicated to a display device 555.

In some implementations, control signals can be communicated from a remote control device 560 to a control signal interface 530. While the link in FIG. 5 is shown as a direct link from the remote control to the video presentation system 500, it should be understood that the link may include intermediate devices (such as, e.g., a set top box, a gateway device, one or more network nodes, repeaters, and other network elements). The control signals can operate to provide requests to the control device 510. The control device can act based upon the requests received through the control signal interface 530.

In some implementations, when a control module 510 receives a request to enter trick mode, the control module can store a pointer to the entry point in a pointer data store 520. In such implementations, upon storing the pointer into the pointer data store 520, the control module 510 can send the video stream to an ad obscurement module 515 to obscure the advertisements from the user while the device is in trick mode.

In some implementations, while obscuring the advertisements, the ad obscurement module 515 can store a pointer to the start of an advertisement and/or the end of an advertisement in the pointer data store 520. Upon receipt of a request to resume normal playback, the control module can compare the pointer at which the trick mode operation started, and the point at which the trick mode operation ended, and determine whether any start advertisement or end advertisement pointers occurred between the start and end of the trick mode operation.

In some implementations, when an advertisement end occurs between a trick mode start pointer and a trick mode end pointer, the video presentation system 500 can determine whether to replay at least a portion of the skipped advertisement break. In additional implementations, a determination can be inferred from whether the user intended to skip advertisements or search through content based upon various inferences that can be made from the timing of the trick mode start request and trick mode end request and their relationship to advertisement pointers. In alternative additional implementations, advertisements can be inserted regardless of the user's intent. In other alternative implementations, advertisements are not inserted regardless of the user's intent. Each of these options can operate lowers the value of using trick mode functionality to skip commercials.

In some implementations, the ad retrieval/refresh module 535 can operate to request third party advertisements 570 (e.g., fresh advertisements) from a third party ad server 565. In some examples, the advertisements queued on an ad store 545 may become stale. In such examples, if the control device identifies a stale advertisement, a fresh third party advertisement 570, for example, can be requested from the third party advertising server 565. The fresh third party advertisement 570 can then be inserted into the stream in replacement of the stale advertisement.

Figure 6:
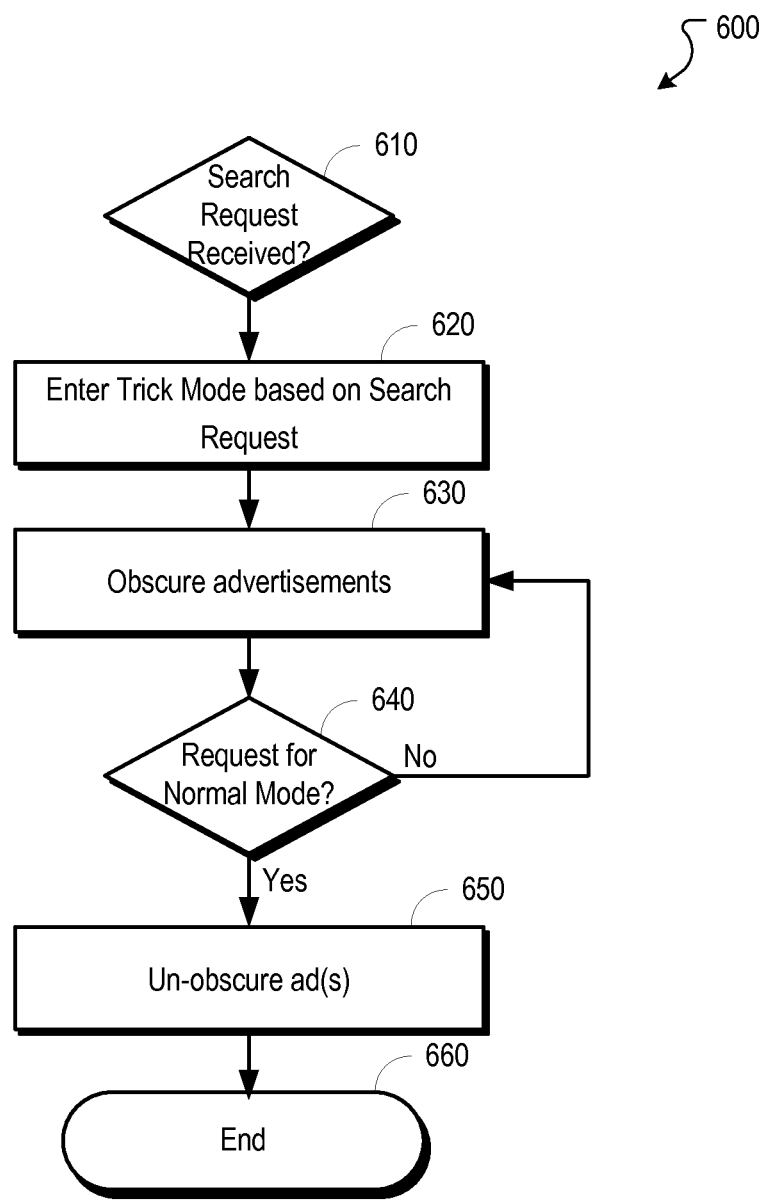
FIGS. 6-8 are flowcharts illustrating various example processes to provide obscured advertisements during trick mode operation.
Figure 7:
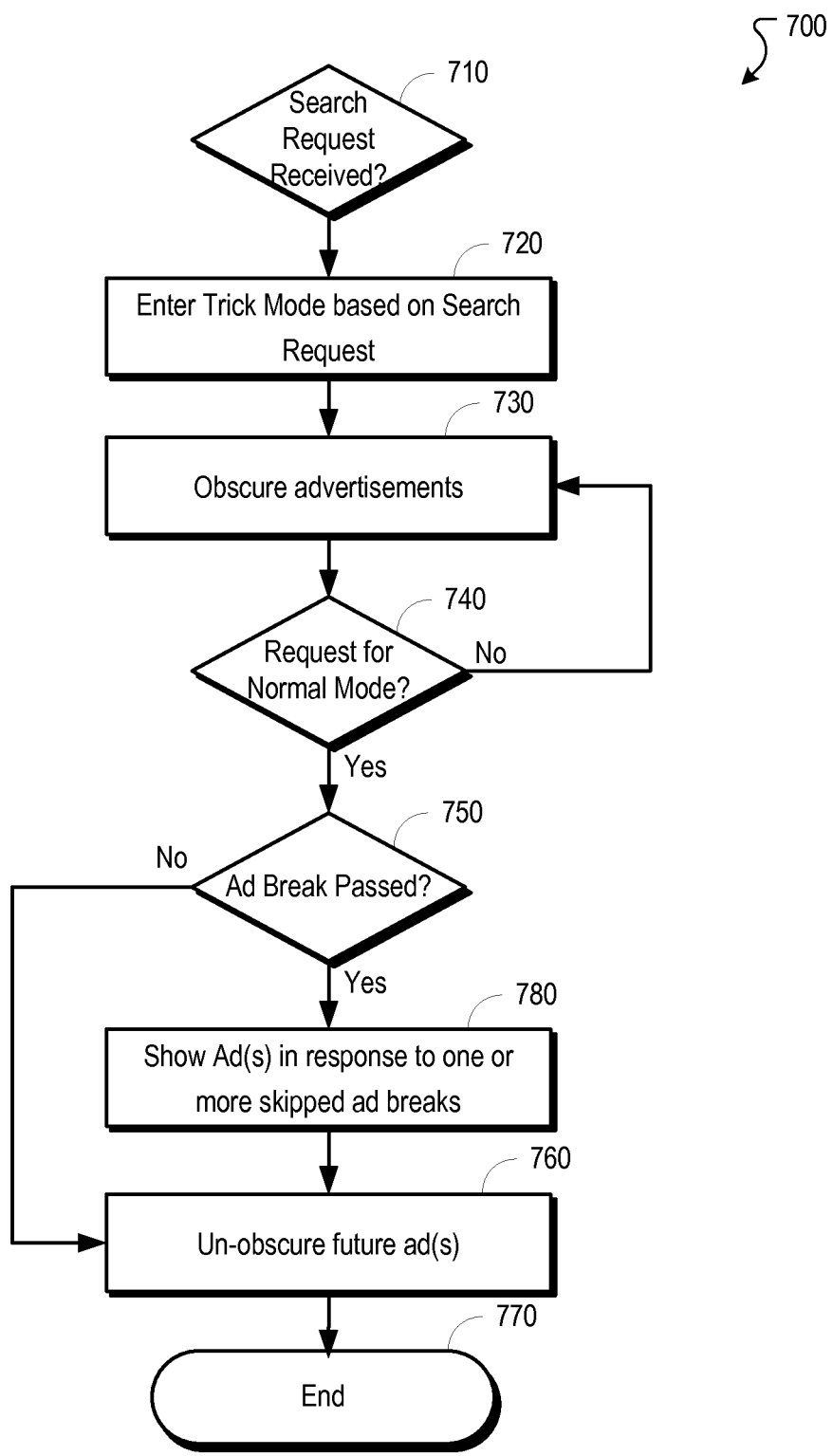
Figure 8:
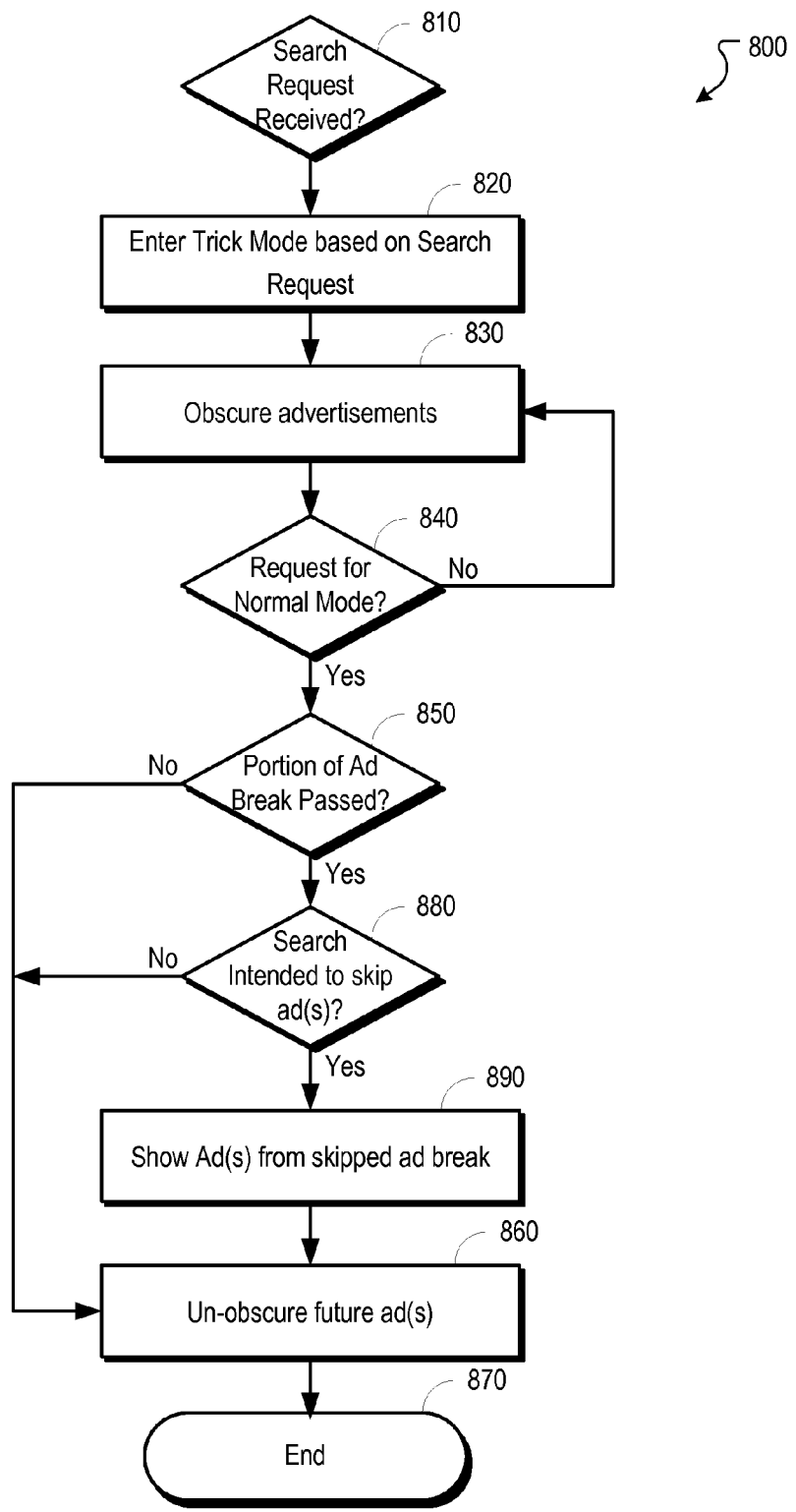

FIGS. 6-8 are flowcharts illustrating various example processes to provide obscured advertisements during trick mode operation. More specifically, FIG. 6 is a flowchart illustrating an example process 600 to obscure advertisements during trick mode operations without inserting advertisements when an at least a portion of an ad break is skipped. This example process 600 begins at stage 610, where a determination is made whether a search request has been received. The determination can be made, for example, by a controller (e.g., control module 510 of FIG. 5) in conjunction with a control signal interface (e.g., control signal interface 530 of FIG. 5). In various implementations, the search request can include: forward search, reverse search, skip ahead, and skip back functionalities, among others.

At stage 620, trick mode is entered based upon receipt of the search request. Trick mode operation can be started, for example, by a controller (e.g., control module 510 of FIG. 5) in conjunction with a content and/or advertisement store (e.g., content store 540 and/or ad store 545 of FIG. 5). In some implementations, trick mode is started by selecting a subset of the content frames from a content data store.

At stage 630, advertisements in trick mode can be obscured. The advertisements can be obscured, for example, by an ad obscurement module (e.g., ad obscurement module 515 of FIG. 5) in conjunction with a controller (e.g., control module 510 of FIG. 5). In some implementations, the ad obscurement module can interact with the controller to identify the start points and end points for advertisement breaks and enable the controller to skip over advertisement breaks in selection of the subset of content frames from the content data store (e.g., when the advertisements have been previously inserted into the content). In implementations where the advertisements are stored separately and inserted at the time of presentation, the controller can merely select frames from the content data store exclusively during trick mode operations (e.g., avoid selecting frames from the advertisement data store).

At stage 640, a determination is made whether the user has requested to resume normal playback. The determination can be identified, for example, by a controller (e.g., control module 510 of FIG. 5) in conjunction with a control signals interface (e.g., control signals interface 530 of FIG. 5). In some implementations, the request for normal mode can be initiated by a remote control (e.g., remote control 560 of FIG. 5) as a result of a user pressing buttons on the remote control. In additional implementations, the control signals can pass through a number of intermediate devices, for example, including one or more of a set top box, a gateway device, a network node, a repeater, or a CMTS device, among many others.

If the determination is made that the presentation system is to stay in trick mode, the process 600 returns to stage 630. However, if the determination is made to return to normal playback, at stage 650, the advertisements are unobscured. The advertisements can be unobscured, for example, by a controller (e.g., control module 510 of FIG. 5) in conjunction with a content and advertisement store (e.g., content data store 540 and ad data store 545 of FIG. 5). The process 600 ends at stage 660.

FIG. 7 is a flowchart illustrating an example process 700 to obscure advertisements during trick mode operations and re-inserting advertisements when an at least a portion of an ad break is skipped. This example process 700 begins at stage 710, where a determination is made whether a search request has been received. The determination can be made, for example, by a controller (e.g., control module 510 of FIG. 5) in conjunction with a control signal interface (e.g., control signal interface 530 of FIG. 5). In various implementations, the search request can include: forward search, reverse search, skip ahead, and skip back functionalities, among others.

At stage 720, trick mode is entered based upon receipt of the search request. Trick mode operation can be started, for example, by a controller (e.g., control module 510 of FIG. 5) in conjunction with a content and/or advertisement store (e.g., content store 540 and/or ad store 545 of FIG. 5). In some implementations, trick mode is started by selecting a subset of the content frames from a content data store.

At stage 730, advertisements in trick mode can be obscured. The advertisements can be obscured, for example, by an ad obscurement module (e.g., ad obscurement module 515 of FIG. 5) in conjunction with a controller (e.g., control module 510 of FIG. 5). In some implementations, the ad obscurement module can interact with the controller to identify the start points and end points for advertisement breaks and enable the controller to skip over advertisement breaks in selection of the subset of content frames from the content data store (e.g., when the advertisements have been previously inserted into the content). In implementations where the advertisements are stored separately and inserted at the time of presentation, the controller can merely select frames from the content data store exclusively during trick mode operations (e.g., avoid selecting frames from the advertisement data store).

At stage 740, a determination is made whether the user has requested to resume normal playback. The determination can be identified, for example, by a controller (e.g., control module 510 of FIG. 5) in conjunction with a control signals interface (e.g., control signals interface 530 of FIG. 5). In some implementations, the request for normal mode can be initiated by a remote control (e.g., remote control 560 of FIG. 5) as a result of a user pressing buttons on the remote control. In additional implementations, the control signals can pass through a number of intermediate devices, for example, including one or more of a set top box, a gateway device, a network node, a repeater, or a CMTS device, among many others.

If the determination is made that the presentation system is to stay in trick mode, the process 700 returns to stage 730. However, if the determination is made to return to normal playback, at stage 750, a determination is made whether an ad break has been passed. The determination of whether an ad break has been passed can be made, for example, by a controller (e.g., control device 510 of FIG. 5) in conjunction with an ad obscurement module (e.g., ad obscurement module 515 of FIG. 5) and a pointer store (e.g., pointer data store 520 of FIG. 5). In some implementations, a pointer to the start of trick mode operations can be stored in the pointer data store. Pointers to the start of trick mode operations and end of trick mode operations can be compared to determine whether an ad start and/or an ad end occurred during trick mode operations. Thus, if any portion of an ad break is passed, that portion can be re-inserted or a new advertisement can be retrieved.

If no portion of the ad break has been skipped, the process can proceed to stage 760 where the future advertisements are unobscured. The future advertisements can be unobscured, for example, by a controller (e.g., control module 510 of FIG. 5) in conjunction with a content and advertisement store (e.g., content data store 540 and ad data store 545 of FIG. 5). The process 700 ends at stage 770.

However, if a portion of the ad break has been skipped, the process can proceed to stage 780, where ad(s) are presented in response to one or more skipped ad breaks. The ad(s) can be presented, for example, by a controller (e.g., control module 510 of FIG. 5) in conjunction with an ad server (e.g., ad data store 545 or third party ad retrieval/refresh module 535 of FIG. 5) and a decoder (e.g., decoder 525 of FIG. 5). The process 700 can then proceed to stage 760 where the future advertisements are unobscured. The future advertisements can be unobscured, for example, by a controller (e.g., control module 510 of FIG. 5) in conjunction with a content and advertisement store (e.g., content data store 540 and ad data store 545 of FIG. 5). The process 700 ends at stage 770.

FIG. 8 is a flowchart illustrating another example process 800 to obscure advertisements during trick mode operations and re-inserting advertisements when an at least a portion of an ad break is skipped. This example process 800 begins at stage 810, where a determination is made whether a search request has been received. The determination can be made, for example, by a controller (e.g., control module 510 of FIG. 5) in conjunction with a control signal interface (e.g., control signal interface 530 of FIG. 5). In various implementations, the search request can include: forward search, reverse search, skip ahead, and skip back functionalities, among others.

At stage 820, trick mode is entered based upon receipt of the search request. Trick mode operation can be started, for example, by a controller (e.g., control module 510 of FIG. 5) in conjunction with a content and/or advertisement store (e.g., content store 540 and/or ad store 545 of FIG. 5). In some implementations, trick mode is started by selecting a subset of the content frames from a content data store.

At stage 830, advertisements in trick mode can be obscured. The advertisements can be obscured, for example, by an ad obscurement module (e.g., ad obscurement module 515 of FIG. 5) in conjunction with a controller (e.g., control module 510 of FIG. 5). In some implementations, the ad obscurement module can interact with the controller to identify the start points and end points for advertisement breaks and enable the controller to skip over advertisement breaks in selection of the subset of content frames from the content data store (e.g., when the advertisements have been previously inserted into the content). In implementations where the advertisements are stored separately and inserted at the time of presentation, the controller can merely select frames from the content data store exclusively during trick mode operations (e.g., avoid selecting frames from the advertisement data store).

At stage 840, a determination is made whether the user has requested to resume normal playback. The determination can be identified, for example, by a controller (e.g., control module 510 of FIG. 5) in conjunction with a control signals interface (e.g., control signals interface 530 of FIG. 5). In some implementations, the request for normal mode can be initiated by a remote control (e.g., remote control 560 of FIG. 5) as a result of a user pressing buttons on the remote control. In additional implementations, the control signals can pass through a number of intermediate devices, for example, including one or more of a set top box, a gateway device, a network node, a repeater, or a CMTS device, among many others.

If the determination is made that the presentation system is to stay in trick mode, the process 800 returns to stage 830. However, if the determination is made to return to normal playback, at stage 850, a determination is made whether an ad break has been passed. The determination of whether an ad break has been passed can be made, for example, by a controller (e.g., control device 510 of FIG. 5) in conjunction with an ad obscurement module (e.g., ad obscurement module 515 of FIG. 5) and a pointer store (e.g., pointer data store 520 of FIG. 5). In some implementations, a pointer to the start of trick mode operations can be stored in the pointer data store. Pointers to the start of trick mode operations and end of trick mode operations can be compared to determine whether an ad start and/or an ad end occurred during trick mode operations. Thus, if any portion of an ad break is passed, that portion can be re-inserted or a new advertisement can be retrieved.

If no portion of the ad break has been skipped, the process can proceed to stage 860 where the future advertisements are unobscured. The future advertisements can be unobscured, for example, by a controller (e.g., control module 510 of FIG. 5) in conjunction with a content and advertisement store (e.g., content data store 540 and ad data store 545 of FIG. 5). The process 800 ends at stage 870.

However, if a portion of the ad break has been skipped, the process can proceed to stage 880, where a determination is made whether the user intended to use the trick mode operation to skip at least a portion of the advertisement break. The determination can be made, for example, by a controller (e.g., control module 510 of FIG. 5) in conjunction with a pointer store (e.g., pointer data store 520 of FIG. 5). In some implementations, the determination can be made based upon the timing of the request to enter trick mode in comparison to the starting point and/or ending point of an advertisement, or the total elapsed time spent in trick mode.

If the trick mode operation is determined not to have been intended to skip an ad break, the process 800 can proceed to stage 860. However, if the trick mode operation was determined to be intended to skip advertisements, the process 800 can proceed to stage 890 where ad(s) are presented in response to one or more skipped ad breaks. The ad(s) can be presented, for example, by a controller (e.g., control module 510 of FIG. 5) in conjunction with an ad server (e.g., ad data store 545 or third party ad retrieval/refresh module 535 of FIG. 5) and a decoder (e.g., decoder 525 of FIG. 5). The process 800 can then proceed to stage 860 where the future advertisements are unobscured. The future advertisements can be unobscured, for example, by a controller (e.g., control module 510 of FIG. 5) in conjunction with a content and advertisement store (e.g., content data store 540 and ad data store 545 of FIG. 5). The process 800 ends at stage 870.

Figure 9:
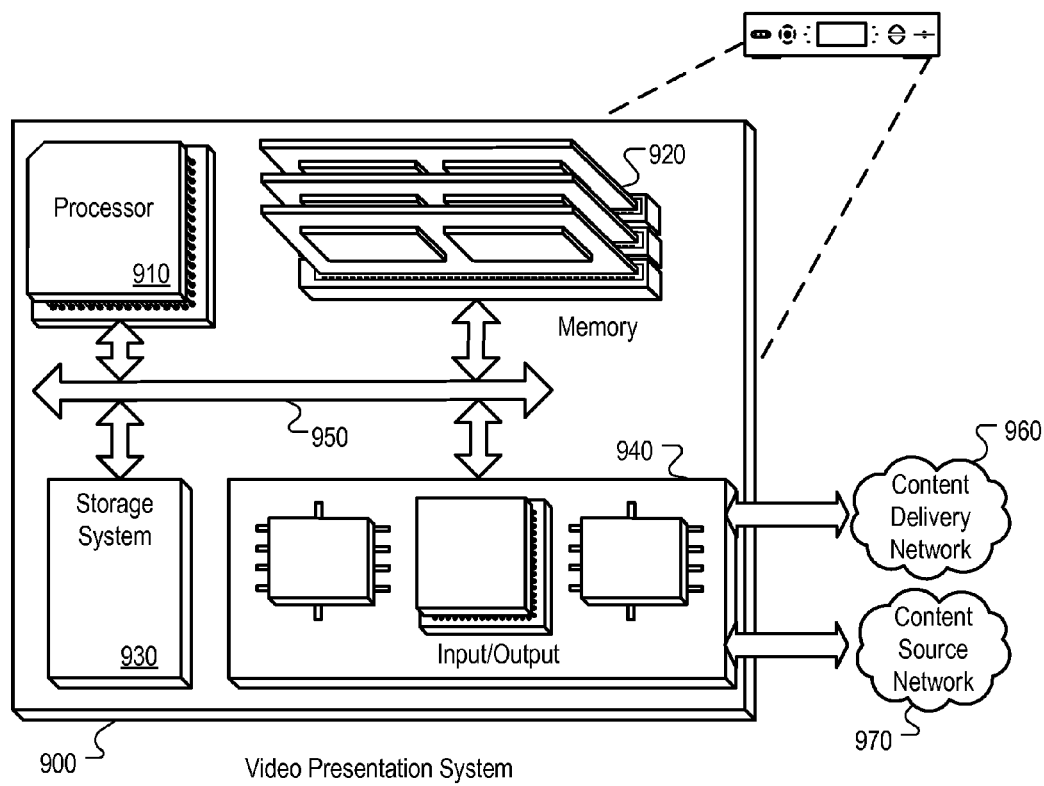
FIG. 9 is a component diagram of an example video presentation system operable to obscure advertisements during trick mode operations.

FIG. 9 is a component diagram of an example video presentation system 900 operable to obscure advertisements during trick mode operations. The improved video presentation system 900 can include a processor 910, a memory 920, a storage device 930, and an input/output device 940. Each of the components 910, 920, 930, and 940 can be interconnected, for example, using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930.

The memory 920 stores information within the device 900. In one implementation, the memory 920 is a computer-readable medium. In one implementation, the memory 920 is a volatile memory unit. In another implementation, the memory 920 is a non-volatile memory unit.

In some implementations, the storage device 930 is capable of providing mass storage for the device 900. In one implementation, the storage device 930 is a computer-readable medium. In various different implementations, the storage device 930 can include, for example, a hard disk device, an optical disk device, flash memory or some other large capacity storage device.

The input/output device 940 provides input/output operations for the device 900. In one implementation, the input/output device 940 can interface to a content delivery network 960 or a content source network 970. In addition, such input/output device 940 can communicate with other external devices through various interfaces such as, for example, an IP network interface device, e.g., an Ethernet card, a cellular network interface, a serial communication device, e.g., and RS-232 port, and/or a wireless interface device, e.g., and 802.11 card. In another implementation, the input/output device can include driver devices configured to receive input data and send output data to other input/output devices (e.g., a content delivery network 960 and/or content source network 970), as well as sending communications to, and receiving communications from various networks (not shown).

The video presentation system of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a digital signal processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer-implemented method, comprising:
   providing a video stream to a user device;
   receiving a search request related to the video stream, the search request initiating a trick mode with respect to the video stream;
   generating a trick mode video stream, the trick mode video stream excluding advertisements from the frames presented within trick mode video stream;
   providing the trick mode video stream to the user device;
   determining that the user intended to skip an advertisement break;
   receiving a request to exit trick mode; and
   providing one or more advertisements to the user device responsive to the determination that the user intended to skip the advertising break and the request to exit trick mode.

2. The computer-implemented method of claim 1, further comprising:
   receiving a request for a normal mode video stream; and
   providing the normal mode video stream to the user device, wherein the normal mode video stream includes advertisements.

3. The computer-implemented method of claim 1, wherein the video stream comprises a digital video stream.

4. The computer-implemented method of claim 3, wherein the trick mode stream comprises a subset of i-frames selected from the digital video stream.

5. The computer-implemented method of claim 1, further comprising:
   determining that a broadcast advertisement has been skipped while in trick mode;
   receiving a request to exit the trick mode; and providing a narrowcast advertisement to the user device prior to resuming normal mode for the video stream.

6. The computer-implemented method of claim 5, further comprising:
storing the broadcast advertisement that was skipped in trick mode and providing the broadcast advertisement as a narrowcast advertisement when normal mode is resumed.

7. The computer-implemented method of claim 5, further comprising:
retrieving a replacement advertisement responsive to determining that the broadcast advertisement has been skipped;
providing the replacement advertisement to the user device for presentation to the user.

8. The computer-implemented method of claim 1, further comprising:
determining that a broadcast advertisement has been skipped while in trick mode;
storing the broadcast advertisement;
receiving a request to exit the trick mode; and
providing the broadcast advertisement to the user device prior to resuming normal mode for the video stream.

9. The computer-implemented method of claim 1, wherein the method is performed by a digital video recorder.

10. The computer-implemented method of claim 1, wherein the method is performed by a video on demand server.

11. One or more non-transitory computer-readable media operable to be executed by a computer processor, the computer-readable media, upon execution by a computer processor being operable to cause the computer processor to:
provide a digital video stream to a user;
receive a search request related to the digital video stream from the user, the search request initiating a trick mode with respect to the digital video stream;
generate a trick mode video stream, the trick mode video stream excluding advertisements from the frames presented within trick mode video stream; and
provide the trick mode video stream to the user;
determine that the user intended to skip an advertisement break;
receive a request to exit trick mode; and
provide one or more advertisements to the user device responsive to the determination that the user intended to skip the advertising break and the request to exit trick mode.

12. The one or more computer-readable media of claim 11, further operable to cause the processor to:
receive a request for a normal mode video stream from the user; and
provide the normal mode video stream to the user, wherein the normal mode video stream includes advertisements.

13. The one or more computer-readable media of claim 12, wherein the trick mode stream comprises a subset of i-frames selected from a digital video stream.

14. The one or more computer-readable media of claim 11, further operable to cause the processor to:
determine that a broadcast advertisement has been skipped while in trick mode; and
provide a narrowcast advertisement to the user prior to resuming normal mode for the digital video stream.

15. The one or more computer-readable media of claim 14, further operable to cause the processor to:
store the broadcast advertisement that was skipped in trick mode and provide the broadcast advertisement as a narrowcast advertisement when normal mode is resumed.

16. The one or more computer-readable media of claim 14, further operable to cause the processor to:
retrieve a replacement advertisement responsive to determining that the broadcast advertisement has been skipped;
provide the replacement advertisement to the user for presentation to the user.

17. The one or more computer-readable media of claim 11, further operable to cause the processor to:
determine that a broadcast advertisement has been skipped while in trick mode;
store the broadcast advertisement; and
provide the broadcast advertisement to the user prior to resuming normal mode for the digital video stream.

18. The one or more computer-readable media of claim 11, wherein the processor and at least a portion of the computer-readable media resides on a digital video recorder.

19. The one or more computer-readable media of claim 11, wherein the processor and at least a portion of the computer-readable media resides on a video on demand server.

* * * * *